(12) United States Patent
Arnott

(10) Patent No.: US 8,113,322 B2
(45) Date of Patent: Feb. 14, 2012

(54) MOTORCYCLE AIR SUSPENSION SYSTEM AND METHOD

(75) Inventor: Adam Arnott, Windermere, FL (US)

(73) Assignee: Arnott, Inc., Cape Canaveral, FL (US)

( * ) Notice: Subject to any disclaimer, the term of this patent is extended or adjusted under 35 U.S.C. 154(b) by 993 days.

(21) Appl. No.: 12/034,257

(22) Filed: Feb. 20, 2008

(65) Prior Publication Data

US 2009/0206530 A1 Aug. 20, 2009

(51) Int. Cl.
F16D 57/00 (2006.01)

(52) U.S. Cl. ........ 188/298; 180/227; 267/33; 267/64.27

(58) Field of Classification Search ............ 188/266, 188/298; 180/227; 280/284; 267/64.16, 267/64.19, 64.23, 64.24, 64.27, 33
See application file for complete search history.

(56) References Cited

U.S. PATENT DOCUMENTS

| | | | |
|---|---|---|---|
| 2,324,058 A | 7/1943 | Boor et al. | |
| 2,571,279 A | 10/1951 | Myklestad | |
| 3,024,875 A | 3/1962 | Stultz | |
| 4,560,042 A | 12/1985 | Sell et al. | |
| 4,566,565 A | 1/1986 | Wicke | |
| 4,664,234 A | 5/1987 | Wight et al. | |
| 5,172,794 A | 12/1992 | Ward | |
| 5,458,219 A | 10/1995 | Anderson | |
| 5,833,036 A | 11/1998 | Gillespie | |
| 6,193,005 B1 * | 2/2001 | Jurrens | 180/227 |
| 6,244,398 B1 | 6/2001 | Girvin et al. | |
| 6,357,546 B1 * | 3/2002 | Crosby, Jr. | 180/227 |
| 6,374,966 B1 | 4/2002 | Lillbacka | |
| 6,648,309 B2 | 11/2003 | Beck | |
| 7,546,894 B1 * | 6/2009 | Glenn | 180/227 |
| 7,559,396 B2 * | 7/2009 | Schwindt | 180/227 |
| 7,798,295 B2 * | 9/2010 | Jurrens | 188/266 |
| 2004/0245746 A1 * | 12/2004 | Chamberlain et al. | 280/284 |

* cited by examiner

Primary Examiner — Christopher Schwartz
(74) Attorney, Agent, or Firm — Brian S. Steinberger; Law Offices of Brian S. Steinberger, P.A.

(57) ABSTRACT

Air suspension systems, devices, apparatus, and methods for allowing motorcycle drivers to increase and decrease compressed air supplies in air suspension devices. Deflating interior air springs/airbags (bladders) inside the devices allows for springs and pistons on shock absorbers in the devices to expand outward separating lower front and rear frame portions which effectively lowers the motorcycle to the ground surface and for the driver to have a firmer ride. Inflating the air springs/airbags (bladders) allows for the springs and the pistons on the shock absorbers in the devices to retract into the devices so that the devices have a more shock absorbing effect giving the rider a smoother ride, which also raises the motorcycles above the ground surface.

13 Claims, 9 Drawing Sheets

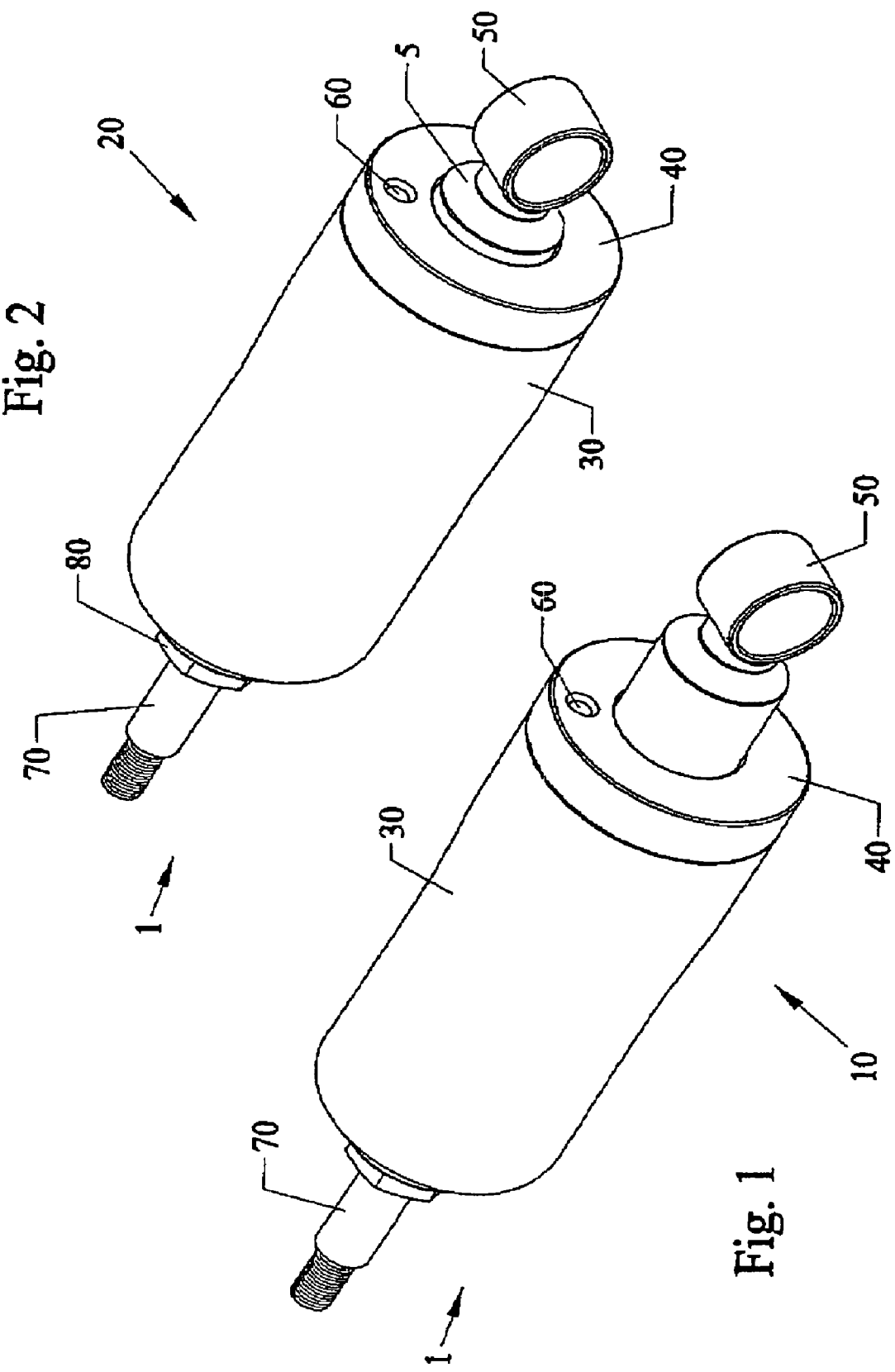

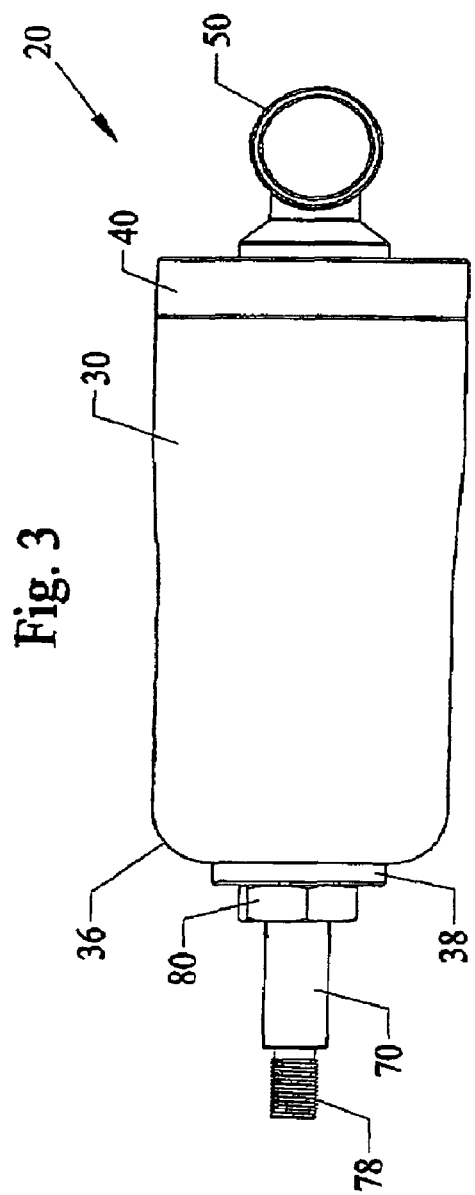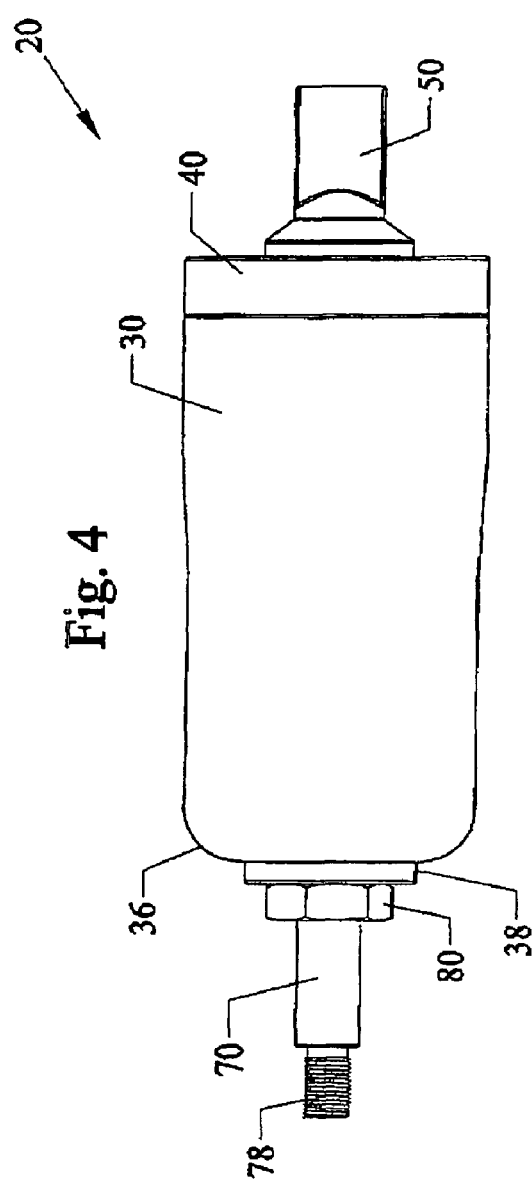

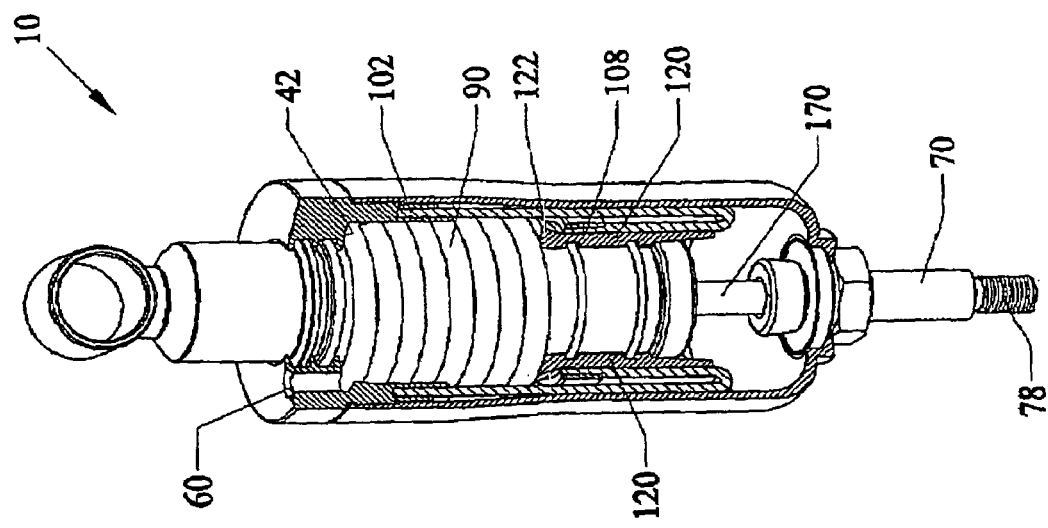
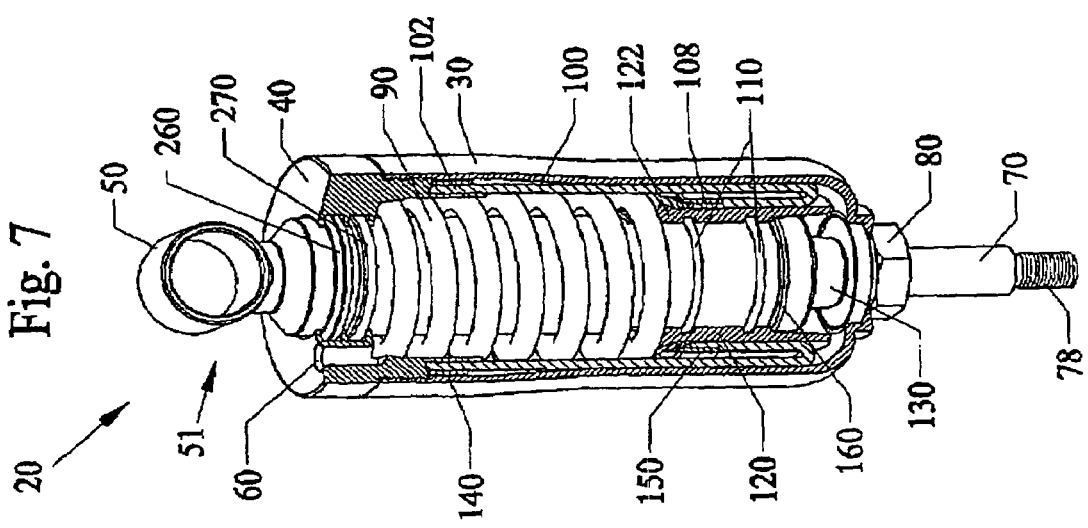

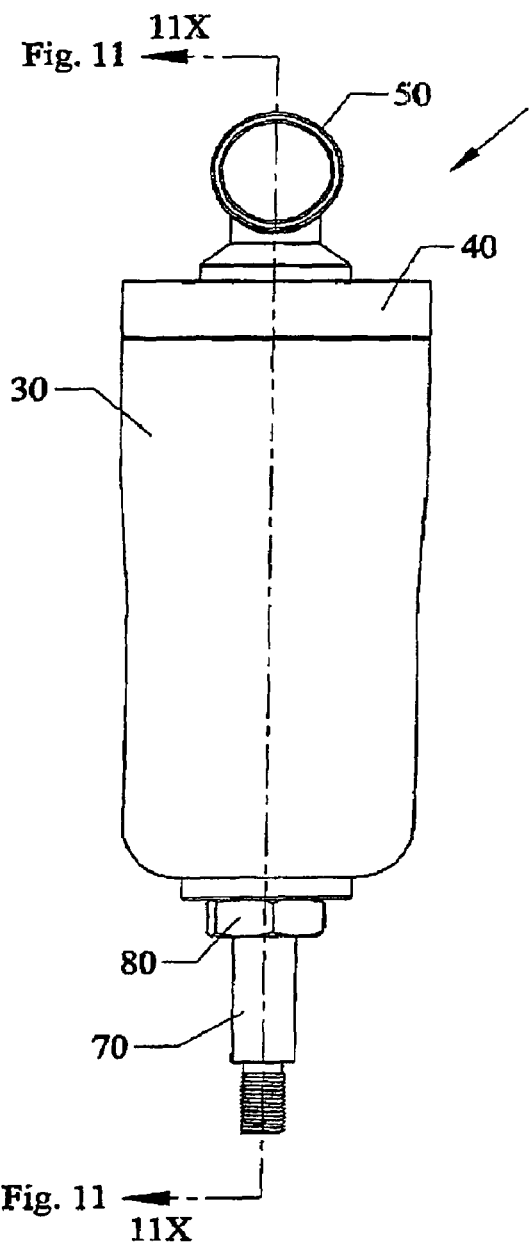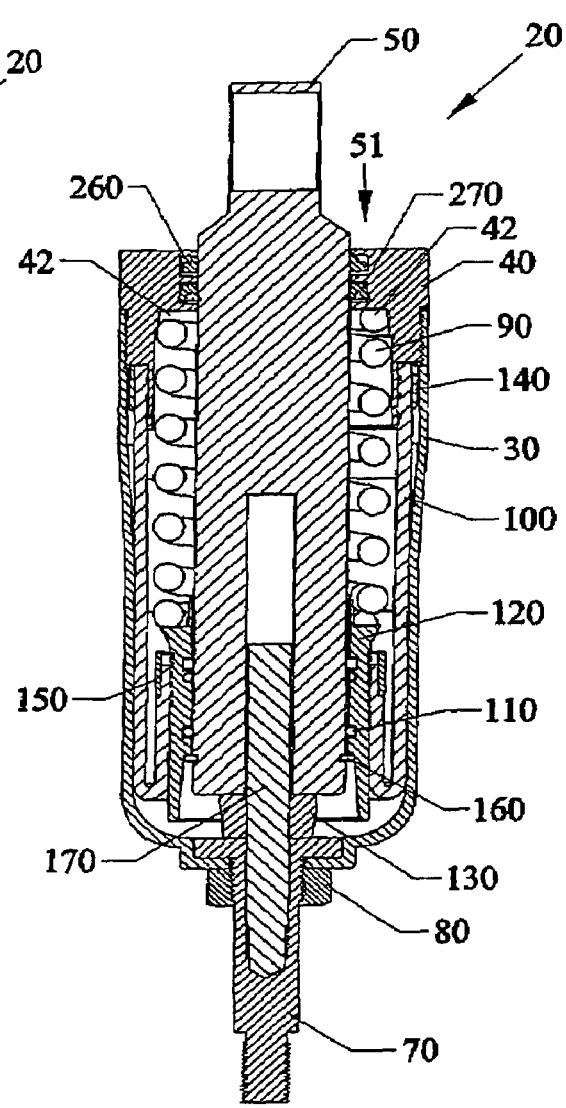

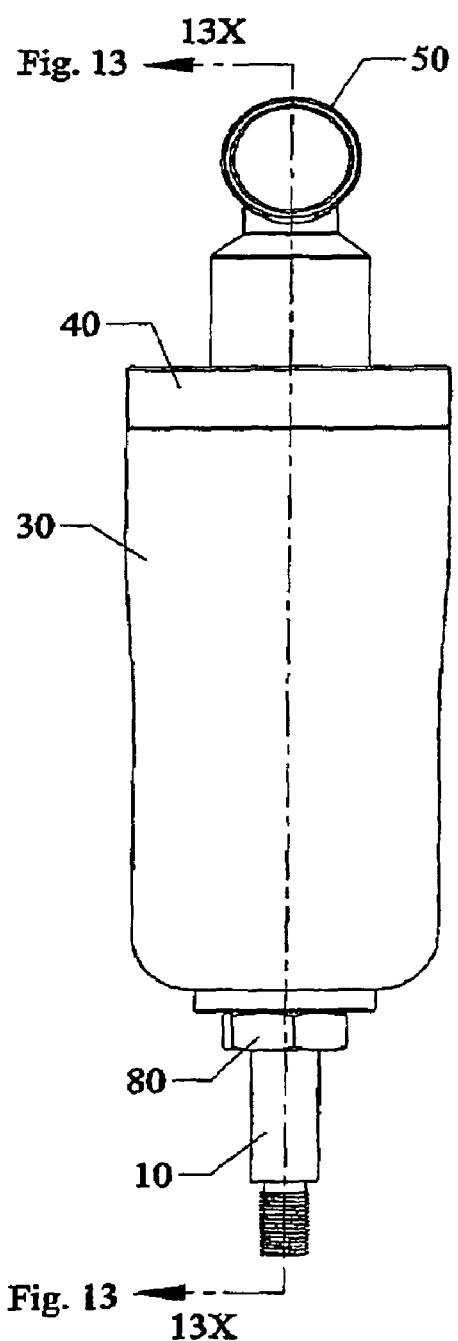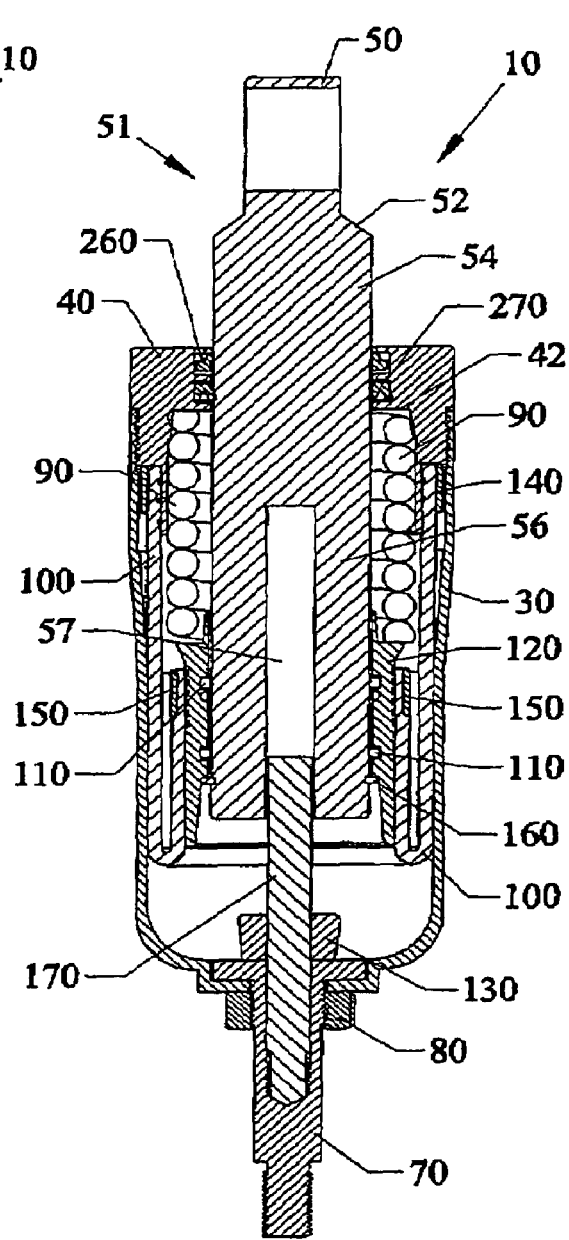

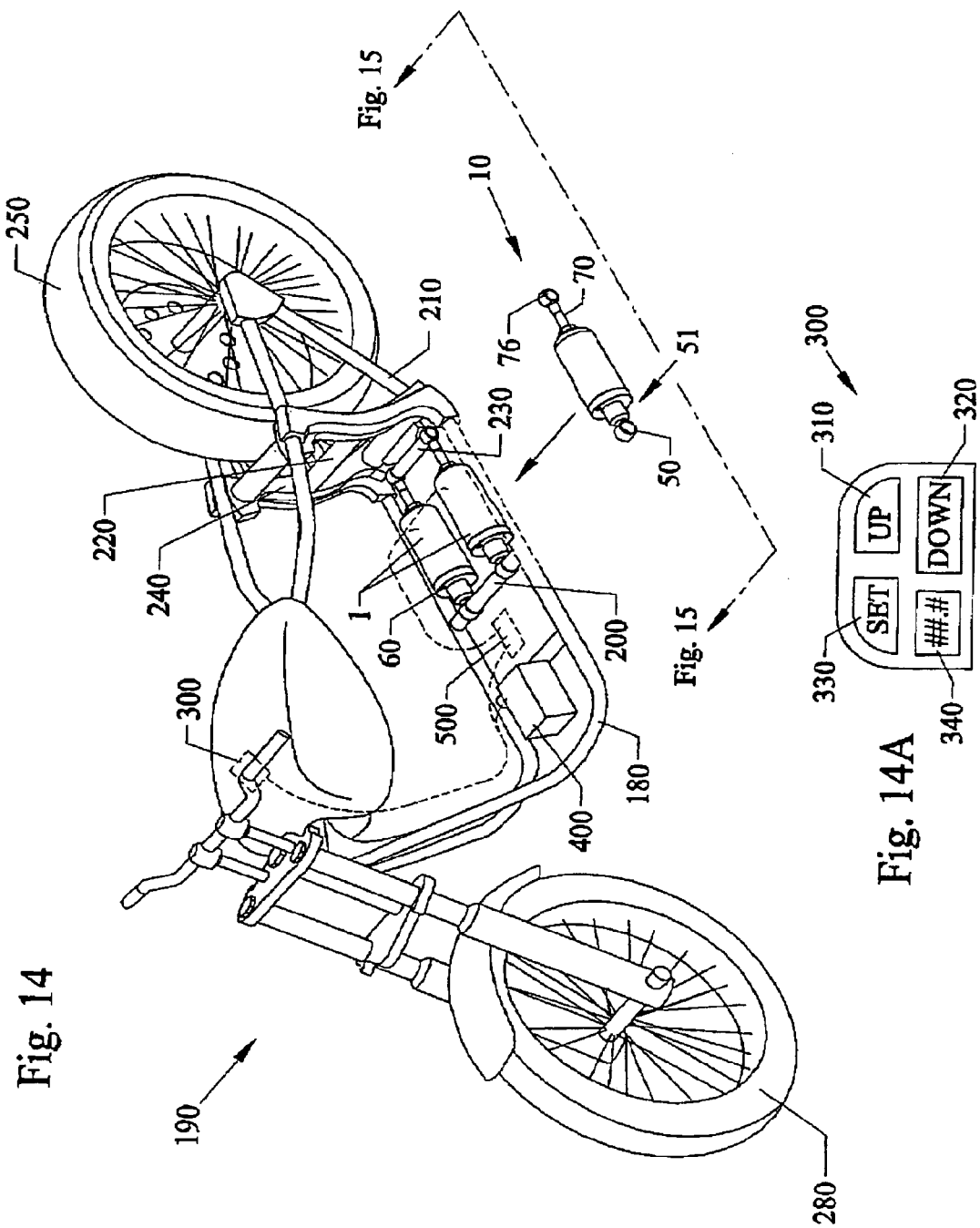

MOTORCYCLE AIR SUSPENSION SYSTEM AND METHOD

This invention relates to air suspension, in particular to adjustable air suspension devices, apparatus, systems and methods, for vehicles such as motorcycles.

BACKGROUND AND PRIOR ART

Conventional, stock, and after-market suspension products such as air shocks and air springs are generally preset to a specific maximum weight accommodation level. This preset suspension does not always provide the best ride or handling for the riders. Additionally, motorcycles are known to have hard rides that are not comfortable for many riders such as the elderly, overweight individuals, and women.

Tuning conventional spring and shocks on for motorcycles can be arduously tedious, taking days or even weeks. Thus, it is not practical to allow for real-time tuning of conventional springs and shocks.

Current springs used in motorcycles are usually progressive in that their lifespan and use deteriorate over time. For example, as the spring compresses, the spring weakens over time, making the ride less desirable for the riders.

Conventional air suspension systems often result in nonsmooth and uncomfortable rides, coupled with undesirable vehicle ride performance.

Various types of air suspension systems have been proposed over the years. U.S. Pat. No. 6,648,309 to Beck describes a piston rod with low/high pressure chambers. U.S. Pat. No. 6,374,966 to Lillbacka describes a piston rod that moves within the chamber and is surrounded by an outer chamber with sealing gaskets. An o-ring seals isolate compartment from environment outside of shock absorber; compressible fluid in inner chamber; coil spring provided about piston rod; air inlet, a fluid, i.e. air, pumped into elastomeric tube so that the inflated elastomeric tube acts as air spring to enhance shock absorbing ability of shock absorber.

U.S. Pat. No. 6,244,398 to Girvin describes a shock absorber with a shaft that extends into a reservoir housing which includes a hydraulic reservoir and gas chamber. The chamber seal includes an o-ring to separate the gas chamber from the hydraulic reservoir. There are springs on the shaft, a piston, and shim washers at the end of the piston, a reservoir cap, reservoir seal, and a bumper.

U.S. Pat. No. 5,833,036 to Gillespie describes an airbag in a reservoir of a cylinder, a piston assembly disposed within an inner cylinder and mounted to a piston rod. The piston rod comprising of piston assembly piston, check valve, a seal ring, seal ring carrier, bypass spring, spring abutment plate, and an end outer cylinder sealed plate with threaded mounting member.

U.S. Pat. No. 5,458,219 to Anderson describes a piston; reservoir containing gas cells. U.S. Pat. No. 5,172,794 to Ward describes a gas bag; piston assembly disposed within inner cylinder; piston rod that moves within piston assembly and extends into rebound chamber; outer cylinder with end cap; seal ring; ring; spring; and an end cap.

U.S. Pat. No. 4,664,234 to Wight; U.S. Pat. No. 4,566,565 to Wicke et al.; and U.S. Pat. No. 4,560,042 to Sell et al.; each describe self pressurized dampers. U.S. Pat. No. 3,024,875 to Stultz describes a shock absorber. U.S. Pat. No. 2,571,279 to Nils O. Mykestad describes a cylinder that defines a fluid reservoir containing a sack where air is introduced to a piston rod with sealing means and springs bear against it. And U.S. Pat. No. 2,324,058 to A. Boor et al. describes a hydraulic shock absorber structure.

The prior art discloses various types of air suspension systems and their respective components. However, none of the cited references overcomes the problems with the prior art described above. More particularly none of the prior art describes an easily adjustable system for use with motorcycles that allows the rider to have an adjustable ride based on the air suspension cylinders on those motorcycles.

Thus, the need exists for solutions to the above problems with the prior art.

SUMMARY OF THE INVENTION

A primary objective of the present invention is to provide adjustable air suspension apparatus, devices, systems and methods for motorcycles to allow the rider to adjust the suspension to accommodate their personal weight as well as any cargo weight.

A secondary objective of the present invention is to provide adjustable air suspension apparatus, devices, systems and methods for motorcycles to allow the rider to have a smoother ride base on a smoother suspension, adjustable suspension height, and adjustable suspension stiffness.

A third objective of the present invention is to provide adjustable air suspension apparatus, devices, systems and methods for motorcycles to allow the rider to have a more comfortable ride, which in turn provides a more enjoyable ride experience.

A fourth objective of the present invention is to provide adjustable air suspension apparatus, devices, systems and methods for motorcycles so that an increase of air will stiffen the ride and raise the suspension, while a release of air will soften the ride and lower the suspension.

A fifth objective of the present invention is to provide adjustable air suspension apparatus, devices, systems and methods for motorcycles to allows the shock absorber(s) to act as an extendable and retractable rod to lower or raise the vehicle.

A sixth objective of the present invention is to provide adjustable air suspension apparatus, devices, systems and methods for motorcycles where tuning air suspension is done to individual tastes and usually reduced to a few minutes via onboard adjustability.

A seventh objective of the present invention is to provide adjustable air suspension apparatus, devices, systems and methods for motorcycles, where air suspension can be instantly set to specific driving conditions, resulting in improved drive handling.

An eighth objective of the present invention is to provide adjustable air suspension apparatus, devices, systems and methods for motorcycles, where adjustability can be customized between various settings that are smooth and comfortable, firm and rigid, or somewhere in the middle. Vehicle rider's performance can be based on the rider's desired settings, with existing components on the motorcycle.

A ninth objective of the present invention is to provide adjustable air suspension apparatus, devices, systems and methods for motorcycles, where adjustability can be based on the riders height, weight, desired ride comfort levels, and other customizations.

Unlike factory installed air suspension shocks, the invention allows the user to raise or lower the rear shocks through the full range of the suspension travel. This gives the rider the flexibility of setting the height of the rear suspension based on the rider's weight, height, and preference, helping ensure both safety and comfort through enhanced control and stability.

The invention can be manufactured to be used in motorized or non-motorized vehicles. This invention uses an inflatable air spring or rubber/elastomeric airbag/bladder, a shock absorber, a coil spring, and a combination of o-rings to make up the air suspension system. The unique configuration of the parts and o-rings is what separates this air suspension from other suspension devices.

The benefits of this invention are a smoother suspension, adjustable suspension height, and adjustable suspension stiffness. A practical application of this invention would be on any softail motorcycle configuration as well as on other vehicles. The end user of the product can adjust the suspension to accommodate their personal weight as well as any cargo weight. This adjustability of the suspension is what improves the ride characteristics of the motorcycle for each individual user.

Conventional, stock, and after-market suspension are pre-set to a specific maximum weight accommodation level. This preset suspension does not always provide the best ride or handling. The invention allows the user to adjust the suspension levels of the vehicle according to their preference. By allowing the user to adjust the suspension level, the adjustable invention provides a comfortable ride, which in turn provides a more enjoyable ride experience. The suspension will absorb the right amount of shock or energy to prevent jerky handling, and adjusting the invention to the appropriate setting will allow the vehicle to handle safer than with a conventional or stock suspension. Air is pumped into and fills the air spring/airbag/bladder, which enables this adjustability; an increase of air will stiffen the ride and raise the suspension, while a release of air will soften the ride and lower the suspension.

Another difference between this invention and others is the use of o-rings to seal the housing of the shock absorber. A unique aspect of the invention is that the housing of the shock absorber slides between the o-rings. This allows the shock absorber to act as a rod to lower or raise the vehicle. The invention is divided into three separate assemblies: the spring, the shock absorber, and the casing. The spring is assembled by using an air spring, a sleeve, two static o-rings, coil spring, o-ring custom top, and crimp rings. Assembly of these parts forms the spring. The crimp rings are circularly compressed to the top and the sleeve to seal the air spring. The coil spring may or may not be used in some assemblies. Acting as a lift helper, the coil spring is used to decrease the amount of air that would be needed to lift a load. It keeps the vehicle at a somewhat standard level, so that adjusting the lift level is not entirely dependent upon air pressure. In fact, with this invention, a minimal amount of air is needed.

The invention combines a shock absorber with inflatable air spring/airbag/bladder and spring along with O-rings and other components. By placing two o-rings in the custom top, sliding the shock absorber through the spring, and securing the new assembly with the retaining ring, the assembly now has a completed spring and shock absorber that work together. The final assembly of the invention is the mounting and casing of the invention. The bump stop is placed over the extension rod, followed by the extension. The airbag can be placed over the existing assembly, and then secured by the hex nut. After tightening the hex nut, the ASAS is complete and ready for vehicle installation.

Further objects and advantages of this invention will be apparent from the following detailed description of the presently preferred embodiments which are illustrated schematically in the accompanying drawings.

BRIEF DESCRIPTION OF THE FIGURES

FIG. 1 is a perspective front right view of a preferred embodiment of the air suspension device in an uncompressed/deflated position with external piston extended.

FIG. 2 is a perspective front right view of the air suspension device of FIG. 1 in a compressed/inflated position with external piston retracted FIG. 3 is a front view of the compressed air suspension device of FIG. 2.

FIG. 4 is a top view of the compressed air suspension device of FIG. 2.

FIG. 7 is a partial cross-sectional perspective view of the compressed air suspension device of FIGS. 2-6.

FIG. 8 is a partial cross-sectional perspective section view of the uncompressed air suspension device of FIG. 1.

FIG. 10 is another front view of the compressed air suspension device of FIG. 3.

FIG. 11 is a side cross-sectional view of the compressed air suspension device of FIG. 10 along arrows 11X FIG. 12 is another front view of uncompressed air suspension device of FIGS. 1 and 8.

FIG. 13 is a side cross-sectional view of the uncompressed air suspension device of FIG. 12 along arrows 13X.

FIG. 14 is a perspective view of a motorcycle frame with air suspension devices being mounted to the frame.

FIG. 14A is an enlarged view of a handlebar mounted control panel shown in FIG. 14.

DESCRIPTION OF THE PREFERRED EMBODIMENTS

Figure 6:
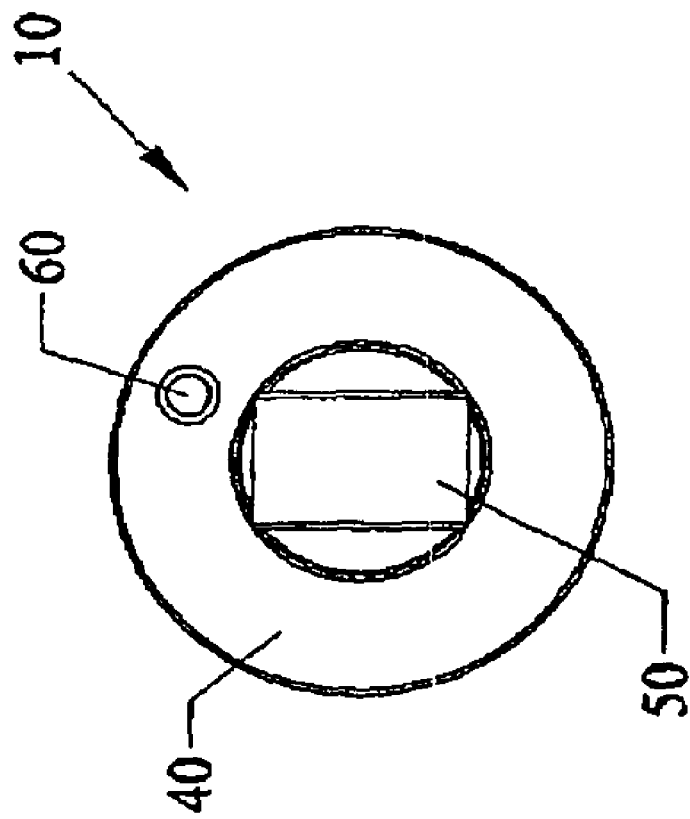
FIG. 6 is a right end view of the compressed air suspension device of FIG. 2.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A list of the components will now be described.

1 air suspension device
10. air suspension device in an uncompressed and deflated position.
20. air suspension device in a compressed and inflated position.
30. airbag can.
33. interior threaded walls.
36. curving end walls
38. protruding ring
40. Top.
42. interior ledge
43. interior grooves
45. Lower exterior threaded walls
47. lower narrow diameter outer wall
50. Outer/external Shock piston ring
51. piston members
52. narrowing neck of upper piston member
54. upper piston member
56. lower hollow piston member
57. air gap inside shock portion
60. Compressed air inlet.

70. Link rod.
71. interior threads
72. enlarged cap end
74. threaded inner end
76. optional ring attached ends
78. threaded outer end
80. Link rod nut.
90. Coil spring.
100. Airbag.
102. Upper end of airbag
108. inner opposite end of airbag
110. O-ring(s).
120. Piston sleeve.
122. enlarged upper end
130. Bumper stop.
140. Airbag crimp ring #1.
150. Airbag crimp ring #2.
160. Retaining ring.
170. Shock extension rod.
171. threaded outer end
178. opposite end
180. Motorcycle frame.
190. Motorcycle.
200. Hard mounting point on motorcycle frame for Shock housing.
210. Rear wheel mount frame.
220. Rocker arm pivot.
230. Mounting point on rocker arm for shock.
240. Rocker arm (part of rear wheel mount frame).
250. Rear wheel.
260. Wiper seal.
270. Gland seal.
280. Front wheel
300. Air suspension control for handlebar
400 battery
500 air compressor FIG. 1 is a perspective front right view of a preferred embodiment of the air suspension device 1 in an uncompressed position 10 with the moveable shock piston ring 50 extended out from the top 40 of the airbag can 30.

FIG. 2 is a perspective front right view of the air suspension device 1 of FIG. 1 in a compressed position 20 with the moveable shock piston ring 50 retracted in toward the top 40 of the airbag can 30.

FIG. 3 is a front view of the compressed air suspension device 20 of FIG. 2.

Figure 5:
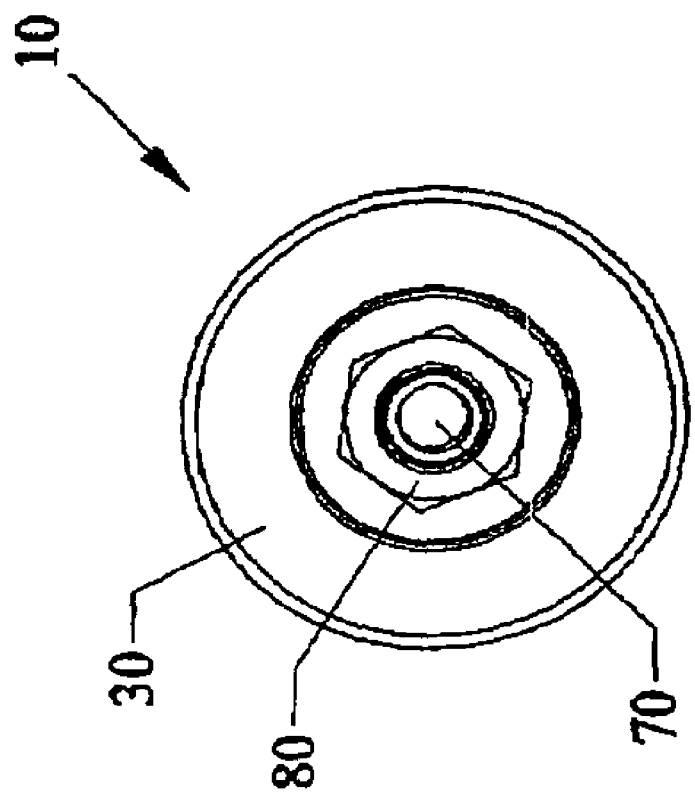
FIG. 5 is a left end view of the compressed air suspension device of FIG. 2.

FIG. 4 is a top view of the compressed air suspension device 20 of FIG. 2. FIG. 5 is a left end view of the compressed air suspension device 20 of FIG. 2. FIG. 6 is a right end view of the compressed air suspension device 20 of FIG. 2.

Referring to FIGS. 1-6, the air suspension device 1 includes an air bag can 30 having a generally cylindrical shape with a top cap end 40 having the outer ring 50 of a moveable piston member 52, 54, 56 extending therefrom. A compressed air inlet 60, whose purpose will be described later in reference to FIGS. 14, 14A, 14B, 15A and 15B allows for a compressed air supply to be selectively input inside of the air suspension device to allow for the extendable piston member 50-58 to either retract or extend from the top 40 of the air can 30. The rear walls 36 of the air can 30 curve back to an external protruding ring 38, where a link rod 70 is held in place by a link rod nut 80.

Figure 9:
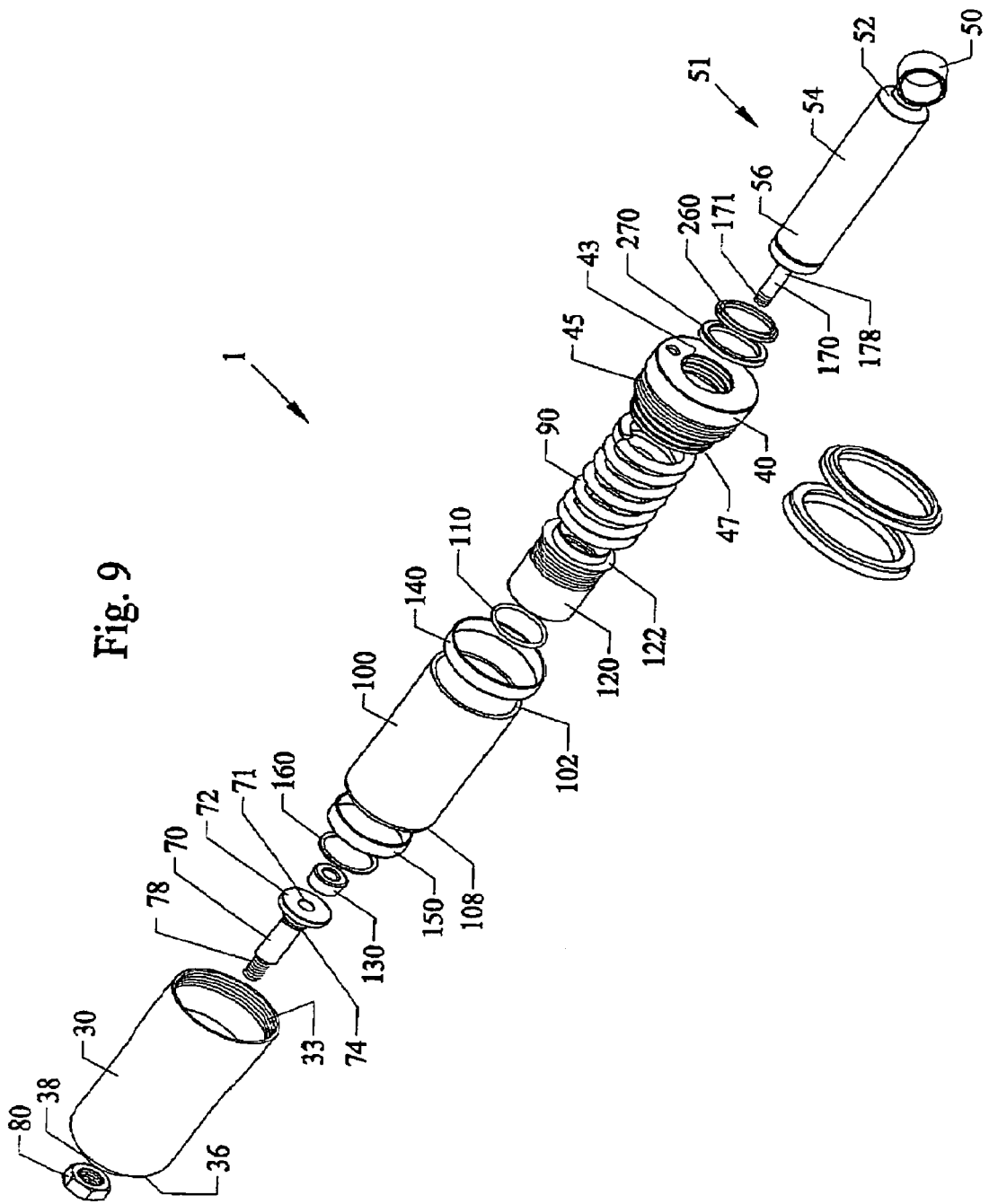
FIG. 9 is an exploded perspective view of the air suspension device.

FIG. 7 is a partial cross-sectional perspective view 20 of the compressed air suspension device 1 of FIGS. 2-6. FIG. 8 is a partial cross-sectional perspective section view 10 of the uncompressed air suspension device of FIG. 1. FIG. 9 is an exploded perspective view of the air suspension device 1 of the preceding figures.

FIG. 10 is another front view 20 of the compressed air suspension device 1 of FIG. 3. FIG. 11 is a side cross-sectional view 20 of the compressed air suspension device 1 of FIG. 10 along arrows 11X FIG. 12 is another front view 10 of uncompressed air suspension device 1 of FIGS. 1 and 8. FIG. 13 is a side cross-sectional view 10 of the uncompressed air suspension device 1 of FIG. 12 along arrows 13X.

Referring to FIGS. 1-4 and 7-12, the suspension device 1 includes a main airbag can 30 having a generally cylindrical shape, with link rod 70 having a threaded end 78 which extends from the ring portion 38 of the rear wall 36. An opposite enlarged cap end 72 has a diameter larger than the through-hole opening in ring 38 and has an inner threaded end portion 72, that is locked in place by link rod nut 80 so that protruding ring end 38 of rear wall 36 is sandwiched between nut 80 and enlarged cap 72. Interior threads 71 on the other side of cap 72 is used to capture threaded outer end 171 of shock extension rod 170 which has an opposite end 178 inside of piston members 51(56, 54, 52, and 50).

Shock extension rod 170 with the lower portion 56, 54 of piston members 51 are positioned inside of top 40 with wiper seal 260 and gland seal 270 positioned within interior grooves 43 of the top 40, so that a fluid seal exists between moveable piston members 51 and top 40. Lower exterior threaded walls 45 of top 40 eventually locks about interior threaded walls 33 in the upper end of airbag can 30. Between the top 40 and the rear wall 36 of airbag can 30, inside of the can 30 is bumper stop 130 on which shock extension rod 170 protrudes therethrough. Upper end 102 of airbag 100 is attached to the outside of lower narrow diameter outer wall 47 of top 40 and is held in place by large diameter airbag crimp ring 140. Lower upwardly bent opposite end 108 of airbag 100 is held in place against piston sleeve 120 by a smaller diameter airbag crimp ring 150. O-ring(s) 110 separate the piston sleeve 120 from the exterior of lower piston member 56. A coil spring 90 is positioned between enlarged upper end 122 of piston sleeve 120 and interior ledge 42 of top 40.

Adding Compressed Air (Inflating Airbag(Bladder))

Referring to FIGS. 7-13, as compressed air is pumped into compressed air inlet 60, airbag 100 expands downward (inflates) within airbag can 30 as shown in FIGS. 7 and 11, while allowing spring 90 to naturally expand to a normal coil expanded state. While in a compressed air state with the airbag (bladder) inflated, the more air added, the firmer the ride is for the rider on the motorcycle.

Figure 15A:
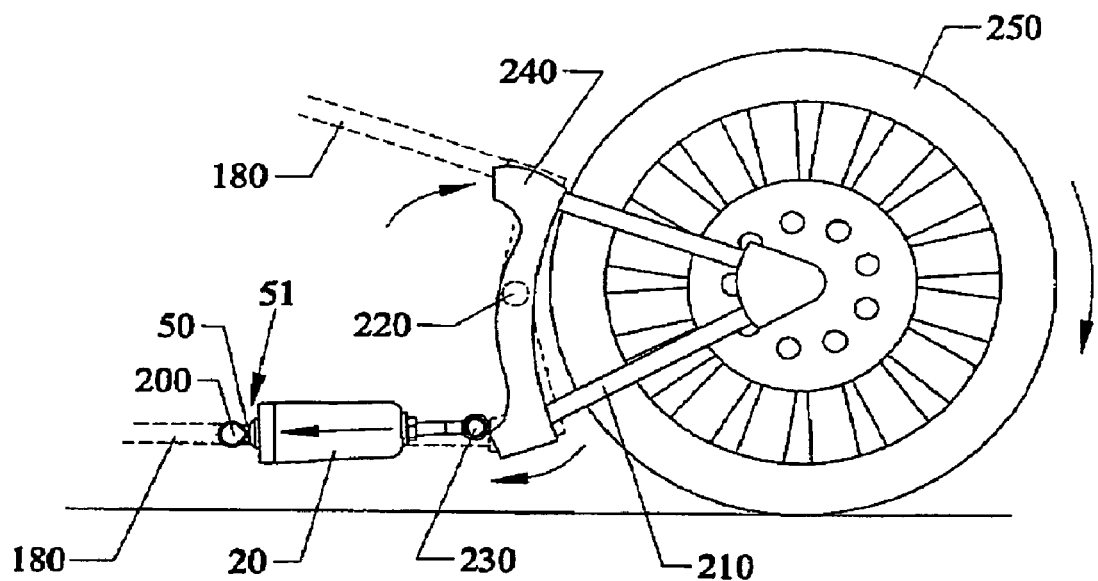
FIG. 15A is an enlarged partial front view of the rear frame and wheel mounted air suspension device(s) of FIG. 14 in an uncompressed position.
Figure 15B:
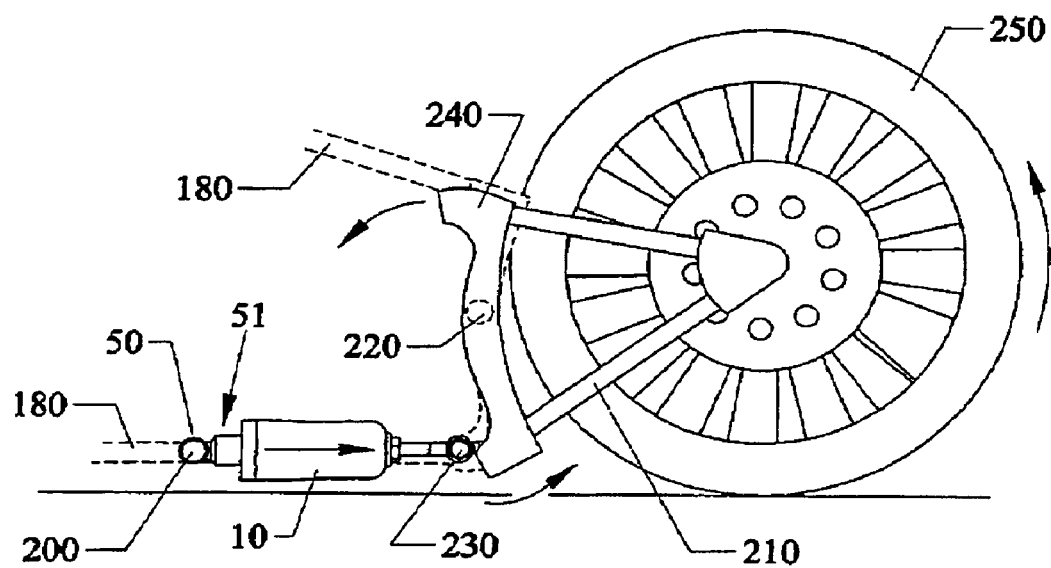
FIG. 15B is another partial front view of the rear frame and wheel mounted air suspension device(s) of FIGS. 14 and 15A in a compressed position.

In addition, as the piston members 51 retract into the airbag can 30, the air suspension device effectively pulls front frame and rear frame portions of the motorcycle together to raise the height of the motorcycle which is explained and shown in relation to FIGS. 15A-15B.

Removing Compressed Air (Deflating Airbag (Bladder))

Referring to FIGS. 7-13, as compressed air is released outward from air inlet 60, airbag 100 retracts (deflates) within airbag can 30 as shown in FIGS. 8 and 13, while contracting spring 90 to a contracted state. While in an uncompressed air state with the airbag (bladder) deflated, the more air removed, the smoother the ride is for the rider on the motorcycle. As shown in FIG. 13, the air gap 57 within lower piston member 56 and the upper end of shock extension rod 170 allows for a greater amount of shock cushion effect which results in a smoother ride.

In addition, as the piston members 51 extend from the top 40, the air suspension device effectively pushes the front frame and rear frame portions of the motorcycle apart from one another so that the height of the motorcycle becomes lower which is explained and shown in relation to FIGS. 15A-15B.

FIG. 14 is a partial perspective view of a motorcycle 190 with air suspension devices 1 being mounted to portions of the frame 200, 230. FIG. 14A is an enlarged view of a handlebar mounted control panel 300 shown in FIG. 14. Referring to FIGS. 14 and 14A, the air suspension devices can have ring end 50 of moveable piston members 51 attached about a hard mounting point 200 on the motorcycle frame that is attached to a front portion of the motorcycle frame 180 toward the direction of front wheel 280. The opposite fixed link rod 70 can have an optional ring end 76 attached to mounting points on a rocker arm 230 that is attached to the rear frame portion of the motorcycle adjacent to the rear wheel 250. Rocker arm 230 has a rocker arm pivot 220 that allows the rocker arm 230 to pivot relative to an upper rocker arm 240 which is part of the rear wheel mount frame 210 which attaches to the rear wheel 250.

A handlebar mounted control panel 300 can be connected to the battery power supply 400 located on the bike which operates an air compressor 500 which supplies compressed air through air inlet ports 60 previously described on the air suspension devices 1. On the panel, switches 310, 320 can be push button switches which either add compressed air to the air suspension devices by depressing button 310, or remove air from the air suspension devices 1 by pressing on button 320. The depressible buttons allow for instant inflation and deflation of the airbags (air bladders) 100 within the air suspension devices, and allow the driver to achieve desired operating conditions of the air suspension devices 1 in minutes.

An operating gauge 340 can show in real-time the amount of compressed air in air suspension devices 1, which can run from approximately 0 PSI (pounds per square inch) for minimum pressure level to as much as approximately 250 PSI for maximum pressure loads. A set button can be preset to different pressure levels so that the operator can immediately depress to various pre-programmed pressure states for settings such as but not limited to states that are smooth and comfortable, firm and rigid, or somewhere in the middle. The rider can further make adjustments to the air suspension devices 1 based on their height, weight, and any other customized conditions as desired.

FIG. 15A is an enlarged partial front view of the rear frame and wheel mounted air suspension device(s) 1 of FIG. 14 in a compressed air position with piston members 51 in retracted position. Here the motorcycle is in a raised position over the ground surface where the rider can have a smooth ride.

FIG. 15B is another partial front view of the rear frame and wheel mounted air suspension device(s) 1 of FIGS. 14 and 15A in an uncompressed air position where the piston members 51 are extended outward from the air suspension devices 1. Here, the motorcycle is in a lowered position to the ground surface, where the rider can have a more firm ride.

While the figures show the novel air suspension device 1 mounted with the moveable shock piston ring 50 attached to the rear frame of the bike, the air suspension device(s) 1 can be oppositely mounted with the moveable shock piston ring attached to the front frame of the motorcycle.

While the preferred embodiment describes the invention as being attached to two wheeled vehicles, such as motorcycles, the invention can be applied to and used with other vehicles.

Although the invention describes use of the air suspension system with air, the invention can be used with other fluids, such as but not limited to other types of gases, liquids, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An adjustable fluid suspension system for two wheeled vehicles, comprising:
   a two wheeled motorized vehicle having a front wheel and a rear wheel;
   a frame for the vehicle having a front frame portion attached to the front wheel, and a rear frame portion attached to the rear wheel;
   an adjustable fluid suspension device having a housing with first end and an opposite second end, the first and second ends being individually attached to the front and rear frame portions, the first end being extendable and retractable from the housing, the air suspension device includes:
   a shock absorber having a piston with an extended and retracted position;
   an internal spring having an extended position and a retracted position;
   an internal inflatable bladder having an inflated position, and a deflated position, wherein inflating the bladder causes the spring to move from the retracted position to the extended position and the piston of the shock absorber to move to the retracted position, causing the first moveable end to be in a compressed position with the moveable first end retracted toward the housing, and wherein deflating the bladder causes the spring to contract and the piston on the shock absorber to become extended so that the first moveable end to be in a uncompressed position with the moveable first end extending from the housing;
   a source of compressed fluid; and
   a control for adjusting compressed fluid levels between the source of compressed fluid and inside the housing of the fluid suspension device, wherein increasing and inflating compressed fluid levels inside the housing causes the first end to retract into the housing so that the suspension device pulls the front wheel toward the rear wheel and raises the vehicle over a ground surface, and deflating and uncompressing fluid levels inside of the housing allows for the front wheel and the rear wheel to pull apart from one another lowering the vehicle over the ground surface.

2. The adjustable fluid suspension system of claim 1, wherein the two wheeled motorized vehicle is a motorcycle.

3. The adjustable fluid suspension system of claim 1, wherein the fluid is a gas.

4. The adjustable fluid suspension system of claim 3, wherein the fluid is air.

5. The adjustable fluid suspension system of claim 1, further comprising:
   a second adjustable fluid suspension device having a second housing with first end and an opposite second end, the first and second ends being individually attached to the front and rear frame portions, the first end being extendable and retractable from the housing, the second adjustable fluid suspension device being mounted parallel to the first adjustable fluid suspension device.

6. The adjustable fluid suspension system of claim 5, wherein the second air suspension device each includes:

a shock absorber having a piston with an extended and retracted position;

an internal spring having an extended position and a retracted position;

an internal inflatable bladder having an inflated position, and a deflated position, wherein inflating the bladder causes the spring to move from the retracted position to the extended position and the piston of the shock absorber to move to the retracted position, causing the first moveable end to be in a compressed position with the moveable first end retracted toward the housing, and wherein deflating the bladder causes the spring to contract and the piston on the shock absorber to become extended so that the first moveable end to be in a uncompressed position with the moveable first end extending from the housing.

7. A method of adjusting fluid suspensions in a two wheeled vehicle, comprising the steps of:

providing a two wheeled vehicle having a front wheel and a rear wheel;

providing a frame for the vehicle having a front frame portion attached to the front wheel, and a rear frame portion attached to the rear wheel;

providing an adjustable fluid suspension device with first end and an opposite second end, wherein the step of providing an adjustable fluid suspension device includes the steps of:

providing a shock absorber with an extendable and retractable piston;

providing an internal spring having an extended position and a retracted position;

providing an internal inflatable bladder having an inflated position, and a deflated position, wherein inflating the bladder causes the spring to move from the retracted position to the extended position and the piston of the shock absorber to move to the retracted position, causing the first moveable end to be in a compressed position with the moveable first end retracted toward the housing, and wherein deflating the bladder causes the spring to contract and the piston on the shock absorber to become extended so that the first moveable end to be in a uncompressed position with the moveable first end extending from the housing;

attaching the first and second ends of the suspension device to the front and rear frame portions, the first end being extendable and retractable from the housing;

adjusting compressed fluid levels inside the fluid suspension device;

increasing and inflating compressed fluid levels inside the device causes the first end to retract into the housing so that the suspension device pulls the front wheel toward the rear wheel and raises the vehicle over a ground surface; and deflating and uncompressing fluid levels allows for the front wheel and the rear wheel to pull apart from one another lowering the vehicle over the ground surface.

8. The method of claim 7, wherein the step of providing an adjustable fluid suspension device includes the steps of:

providing two parallel adjustable fluid suspension devices.

9. The method of claim 8, wherein each of the two adjustable fluid suspension devices includes the steps of:

providing a shock absorber with an extendable and retractable piston;

providing an internal spring having an extended position and a retracted position;

providing an internal inflatable bladder having an inflated position, and a deflated position, wherein inflating the bladder causes the spring to move from the retracted position to the extended position and the piston of the shock absorber to move to the retracted position, causing the first moveable end to be in a compressed position with the moveable first end retracted toward the housing, and wherein deflating the bladder causes the spring to contract and the piston on the shock absorber to become extended so that the first moveable end to be in a uncompressed position with the moveable first end extending from the housing.

10. The method of claim 7, wherein deflating and the decreasing of compressed fluid levels inside the device includes the step of:

providing a smoother ride to a rider on the two wheeled vehicle.

11. An adjustable fluid suspension system for two wheeled vehicles, comprising:

a two wheeled motorized vehicle having a front wheel and a rear wheel;

a frame for the vehicle having a front frame portion attached to the front wheel, and a rear frame portion attached to the rear wheel;

an adjustable fluid suspension device having a housing with first end and an opposite second end, the first and second ends being individually adapted to be attached to front and rear frame portions of a two wheeled motorized vehicle having a front wheel and a rear wheel, the first end being extendable and retractable from the housing, the air suspension device includes:

a shock absorber having a piston with an extended and retracted position;

an internal spring having an extended position and a retracted position;

an internal inflatable bladder having an inflated position, and a deflated position, wherein inflating the bladder causes the spring to move from the retracted position to the extended position and the piston of the shock absorber to move to the retracted position, causing the first moveable end to be in a compressed position with the moveable first end retracted toward the housing, and wherein deflating the bladder causes the spring to contract and the piston on the shock absorber to become extended so that the first moveable end to be in a uncompressed position with the moveable first end extending from the housing;

a source of compressed fluid; and a control for adjusting compressed fluid levels between the source of compressed fluid and inside the housing of the fluid suspension device, wherein increasing and inflating compressed fluid levels inside the housing causes the first end to retract into the housing so that the suspension device is adapted to pull the front wheel toward the rear wheel and is adapted to raise the vehicle over a ground surface, and deflating and uncompressing fluid levels inside of the housing is adapted to allow for the front wheel and the rear wheel to pull apart from one another and is adapted to lower the vehicle over the ground surface.

12. The adjustable fluid suspension system of claim 11, further comprising:

a second adjustable fluid suspension device having a second housing with first end and an opposite second end, the first and second ends being individually attached to the front and rear frame portions, the first end being extendable and retractable from the housing, the second adjustable fluid suspension device being mounted parallel to the first adjustable fluid suspension device.

13. The adjustable fluid suspension system of claim 12, wherein the second air suspension device each includes:
- a shock absorber having a piston with an extended and retracted position;
- an internal spring having an extended position and a retracted position;
- an internal inflatable bladder having an inflated position, and a deflated position, wherein inflating the bladder causes the spring to move from the retracted position to the extended position and the piston of the shock absorber to move to the retracted position, causing the first moveable end to be in a compressed position with the moveable first end retracted toward the housing, and wherein deflating the bladder causes the spring to contract and the piston on the shock absorber to become extended so that the first moveable end to be in a uncompressed position with the moveable first end extending from the housing.

* * * * *